United States Patent
Rigoni

(10) Patent No.: US 9,306,455 B2
(45) Date of Patent: Apr. 5, 2016

(54) HYSTERETIC POWER CONVERTER WITH SWITCH GATE CURRENT SENSE

(71) Applicant: Dialog Semiconductor GmbH, Kirchheim/Teck-Nabern (DE)

(72) Inventor: Fabio Rigoni, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 226 days.

(21) Appl. No.: 14/065,733

(22) Filed: Oct. 29, 2013

(65) Prior Publication Data

US 2014/0117961 A1    May 1, 2014

(30) Foreign Application Priority Data

Oct. 30, 2012    (EP) ..................................... 12190681

(51) Int. Cl.
*H02M 3/156* (2006.01)
*H02M 1/00* (2007.01)

(52) U.S. Cl.
CPC ............ *H02M 3/1563* (2013.01); *H02M 3/156* (2013.01); *H02M 2001/0009* (2013.01)

(58) Field of Classification Search
CPC ..................... H02M 2001/0009; H02M 3/156; H02M 3/1563
See application file for complete search history.

(56) References Cited

U.S. PATENT DOCUMENTS

| | | | |
|---|---|---|---|
| 7,576,527 B1 * | 8/2009 | Zhang et al. | 323/284 |
| 2004/0004470 A1 * | 1/2004 | Yoshida et al. | 323/284 |
| 2004/0178783 A1 | 9/2004 | Uematsu et al. | |
| 2005/0035748 A1 * | 2/2005 | Inn | H02M 3/1588 323/285 |
| 2005/0162143 A1 * | 7/2005 | Fukumoto | H02M 1/4225 323/284 |
| 2005/0212498 A1 * | 9/2005 | Kubota et al. | 323/282 |
| 2011/0156687 A1 * | 6/2011 | Gardner | H02M 3/156 323/284 |
| 2012/0025919 A1 * | 2/2012 | Huynh | H02M 3/1563 331/34 |
| 2012/0249093 A1 * | 10/2012 | Grbo | H02M 3/1588 323/234 |

FOREIGN PATENT DOCUMENTS

WO    WO 2012109680 A2 *    8/2012

OTHER PUBLICATIONS

European Search Report 12190681.2-1804 Mailed: Apr. 15, 2013, Dialog Semiconductor GmbH.

* cited by examiner

*Primary Examiner* — Fred E Finch, III
(74) *Attorney, Agent, or Firm* — Saile Ackerman LLC; Stephen B. Ackerman

(57) ABSTRACT

A driver circuit for a switched-mode power converter is configured to perform hysteretic control of a switched-mode power converter. The switched-mode power converter comprises an inductor configured to store energy during a first state of the switch and to release energy towards a load of the switched-mode power converter during a second state of the switch. The driver circuit comprises a filter unit which is configured to determine a command signal based on a gate control signal applied to a gate of the switch. The command signal is indicative of a current through the inductor. The driver circuit comprises hysteretic control circuitry configured to generate the gate control signal based on the command signal; wherein the switch alternates between the first and second state when being subjected to the gate control signal.

16 Claims, 10 Drawing Sheets

HYSTERETIC POWER CONVERTER WITH SWITCH GATE CURRENT SENSE

TECHNICAL FIELD

The present document relates to switched-mode power converters. In particular, the present document relates to a driver circuit for a switched-mode power converter which is configured to perform hysteretic control.

BACKGROUND

The length of the commutation cycle and/or the duty cycle of a switched-mode power converter (e.g. a boost-converter, a buck converter or a buck-boost converter) may be controlled using hysteretic control. In order to perform a hysteretic control, the current within the switched-mode power converter must be measured to realize the control feedback to a hysteretic comparator within the driver circuit. The sensing of the current within the switched-mode power converter may be performed using external current sensing components which are external to the driver circuit.

The use of an external current sensing component is disadvantageous because it increases the area consumption on the board of an integrated circuit (IC) comprising the switched-mode power converter. Furthermore, the external current sensing component leads to additional cost, notably when requiring high accuracy measurements. The cost can be lowered by choosing e.g. a chip resistance, but the system typically suffers due to the lower tolerance of cheaper current sensing components. This leads to the fact that the inaccuracy cannot be compensated for on the chip. In addition, the use of an external current sensing component increases the pin count, because an additional pin is required for the current measurement.

The present document addresses the above mentioned shortcomings of switched-mode power converters which are submitted to hysteretic control. In particular, the present document describes a driver circuit for the hysteretic control of a switched-mode power converter, wherein the driver circuit does not make use of external current sensing means. As a result, the driver circuit has a reduced pin count and an IC comprising the switched-mode power converter can be implemented in a cost efficient manner.

SUMMARY

According to an aspect of the invention, a driver circuit configured to control a switch of a switched-mode power converter is described. The switched-mode power converter may comprise e.g. a boost converter, a buck converter or a buck-boost converter. The switched-mode power converter may be configured to provide an output voltage for a load of the power converter, subject to an input voltage. The switch may comprise a metal oxide semiconductor field effect transistor. The switched-mode power converter typically comprises an inductor configured to store energy (e.g. a current) during a first state of the switch and configured to release energy towards a load or towards an output of the switched-mode power converter during a second state of the switch. As such, an inductor current through the inductor may be indicative of the energy flow through the switched-mode power converter.

The driver circuit may be configured to perform a hysteretic control of the switch based on an estimate of the inductor current and/or based on the output voltage. In particular, the driver circuit may be configured to regulate the power converter, such that the output voltage corresponds to a target (or reference) voltage, even when subject to load transients.

The driver circuit may comprise a filter unit which is configured to determine a command signal based on a gate control signal applied to a gate of the switch. The command signal may be indicative of a current through the inductor. In other words, the command signal may provide an estimate of the inductor current. As such, the driver circuit may be configured to determine an estimate of the inductor current based on the gate control signal, without the need of external current sensing means and without the need of an additional pin for receiving an indication of the inductor current from the external current sensing means.

Furthermore, the driver circuit may comprise hysteretic control circuitry configured to generate the gate control signal based on the command signal. In other words, the command signal which is indicative of the inductor current is used by the hysteretic control circuitry to determine the gate control signal which is used to control the switch of the power converter. In particular, the switch alternates between the first and second state when being subjected to the gate control signal.

The filter unit may comprise a low pass filter configured to determine a low pass filtered signal from the gate control signal. The low pass filter may be configured to integrate the gate control signal over the time line, thereby yielding the low pass filtered signal. The low pass filtered signal may be indicative of the current through the inductor. For this purpose, design parameters of the low pass filter may be selected such that the low pass filtered signal is indicative of the current through the inductor. In particular, the design parameters of the low pass filter may depend on an inductance of the inductor. The low pass filter may comprise an RC circuit with a resistor and a capacitor. The resistor and the capacitor may be dependent on the inductance of the inductor. The command signal which is passed to the hysteretic control circuitry may be derived from the low pass filtered signal.

The filter unit may comprise a high pass filter configured to remove a DC component from the low pass filtered signal, thereby yielding an AC signal. The high pass filter may comprise a capacitor. The DC component may depend on a supply voltage for the gate control signal and/or on a duty cycle of the switch. The command signal for the hysteretic control circuitry may be derived from the AC signal.

The filter unit may be configured to offset the AC signal by a feedback signal. The feedback signal may be indicative of the output voltage of the power converter. The offset AC signal may correspond to the command signal. As such, the command signal may be determined based on the estimated inductor current and based on the output voltage.

The hysteretic control circuitry may comprise a comparator configured to compare the command signal with a reference signal. The reference signal may be indicative of a target voltage of the output voltage of the switched-mode power converter. The hysteretic control circuitry may be configured to generate the gate control signal as a pulse width modulated (PWM) signal, based on the comparison of the command signal to the reference signal. In particular, the hysteretic control circuitry may be configured to generate a "high" signal if the difference between the command signal and the reference signal exceeds a first threshold and a "low" signal if the difference falls below a second threshold, thereby generating a succession of alternating "high" and "low" signals which are used to generate the PWM signal. The first threshold may be different, e.g. higher, than the second threshold.

The hysteretic control circuitry may comprise a current limitation circuit configured to modify the gate control signal such that the current through the inductor does not exceed a pre-determined inductor current threshold.

According to another aspect, a system for deriving a regulated output voltage from an input voltage is described. The system comprises a switched-mode power converter comprising a switch. The switched-mode power converter may comprise an inductor configured to store energy during a first state of the switch and configured to release energy towards a load of the switched-mode power converter during a second state of the switch. Furthermore, the system comprises a driver circuit according to any of the aspects described in the present document. The driver circuit is configured to provide a gate control signal, wherein the switch alternates between the first and second state when being subjected to the gate control signal.

According to another aspect, a method for operating a driver circuit as outlined in the present document is described. The method may comprise steps which correspond to the features of the driver circuit described in the present document. In particular, a method for controlling the switch of a switched-mode power converter is described. The switched-mode power converter typically comprises an inductor configured to store energy during a first state of the switch and configured to release energy towards a load of the switched-mode power converter during a second state of the switch. The method may comprise determining a command signal based on a gate control signal applied to a gate of the switch. The command signal may be indicative of the current through the inductor. Furthermore, the method may comprise generating the gate control signal based on the command signal. The switch may alternate between the first and second state when being subjected to the gate control signal.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

SHORT DESCRIPTION OF THE FIGURES

The invention is explained below in an exemplary manner with reference to the accompanying drawings.

DETAILED DESCRIPTION

Figure 1:
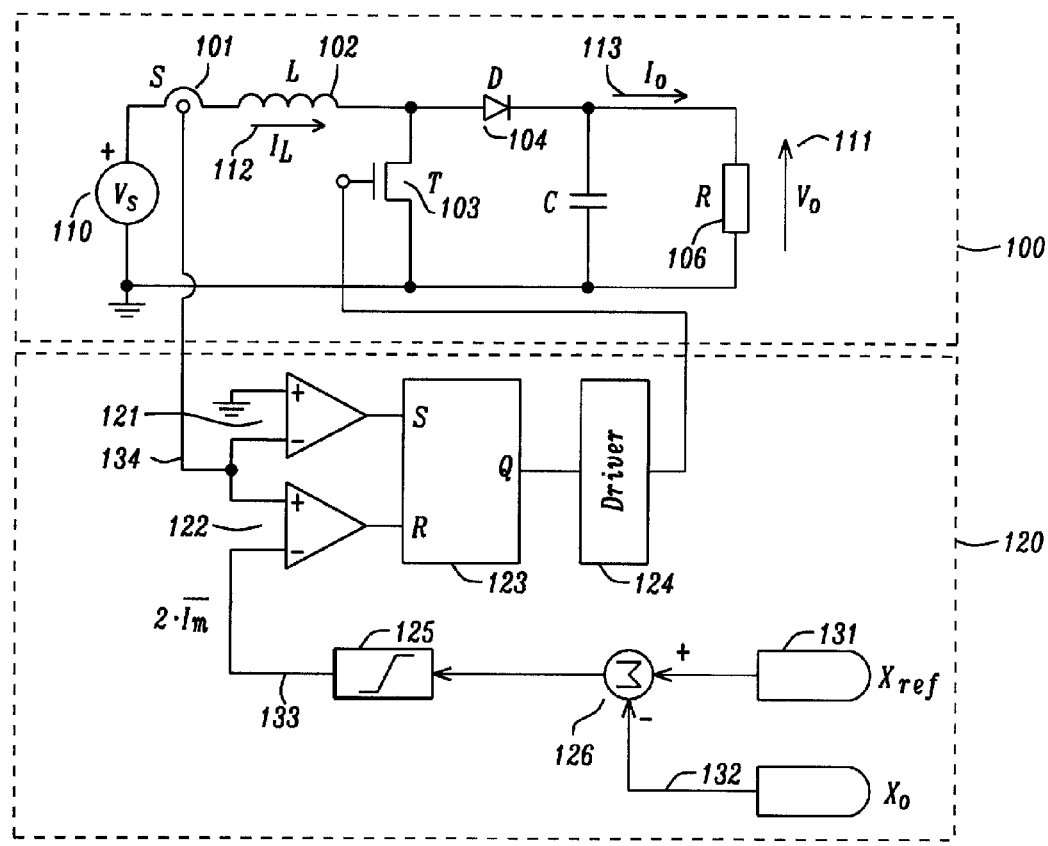
FIG. 1 illustrates a block diagram of an example switched-mode power converter and an example driver circuit which make use of explicit current sensing means.

FIG. 1 illustrates a block diagram of an example switched-mode power converter 100 (a boost converter in the illustrated example) and an example driver circuit 120. The driver circuit 120 is configured to perform a hysteretic control of the power converter 100. For this purpose, the driver circuit 120 receives a sensed current 134, wherein the sensed current 134 corresponds to the inductor current $I_L$ 112 through the inductor 102 of the power converter 100. The power converter 100 comprises current sensing means 101 (e.g. a resistor) arranged in series with the inductor 102, thereby providing the sensed current 134. The driver circuit 120 comprises a pin which may be coupled to the current sensing means 101, thereby providing the driver circuit 120 with the feedback current 134.

Furthermore, the driver circuit 120 receives a feedback voltage $X_o$ 132, wherein the feedback voltage $X_o$ 132 is typically proportional to the output voltage $V_o$ 111 of the power converter 100. The feedback voltage 132 may be derived from the output voltage 111 using a voltage divider.

The power converter 100 of FIG. 1 is configured to convert the input voltage $V_s$ 110 into the output voltage 111. For this purpose, the power converter 110 comprises the inductor 102 which stores energy during an on-state of the switch 103 and which passes this energy towards a load 106 of the power converter 100 during an off-state of the switch 103. Furthermore, the power converter 100 comprises a capacitor 105 which is configured to store a charge provided via the inductor 102, thereby providing a stable output voltage 111 at the output of the power converter 100. The diode 104 prevents a discharge of the capacitor 105 during the on-state of the switch 103.

The commutation cycle rate of the switch 103 (i.e. the frequency of succeeding on-states and off-states) and/or the duty cycle of the switch 103 (i.e. a ratio of the length of an on-state and the length of a commutation cycle) may be controlled, thereby controlling the conversion ratio of the power converter 100, i.e. the ratio between the output voltage 111 and the input voltage 110. Typically, the power converter 100 is controlled such that the output voltage 111 stays at a pre-determined level even subject to transients of the load 106 (causing transients of the load current $I_o$ 113). This is particularly relevant when providing power to microprocessors where the load current 113 may vary e.g. between 10 mA during a sleeping phase of the microprocessor and 250 mA upon start-up of the microprocessor, thereby submitting the power converter 100 to a significant load transient.

The driver circuit 120 is configured to control the commutation cycle rate and/or the duty cycle of the switch 103 such that the power converter 100 provides an output voltage 111 at a pre-determined level. In other words, the driver circuit 120 may be configured to control time instants and lengths of the on-states/off-states of the switch 103 such that the power converter 100 provides an output voltage 111 at a pre-determined level. The pre-determined level of the output voltage 111 may be set by a reference voltage) $X_{ref}$ 131 which is compared to the feedback voltage 132 using the voltage comparator 126. The output of the voltage comparator 126 may be integrated over the time using the integrator 125, thereby providing a deviation current 133 (or a deviation voltage) which is indicative of a deviation of the output voltage 111 from the desired pre-determined level.

The sensed current 134 (or a corresponding voltage) and the deviation current 133 (or a corresponding voltage) are analyzed in comparing units 121, 122. In the illustrated example, the first comparing unit 121 and the second comparing unit 122 drive the S and R gate of an SR latch 123, respectively, thereby generating a Q signal which takes and values 0 and 1. The Q signal may be used to control the gate of the switch 103 of the power converter 100 using the driver 124, thereby switching the switch 103 between the on-state and the off-state.

The driver circuit 120 of FIG. 1 is disadvantageous as it requires an additional pin for receiving the sensed current 134, thereby increasing the cost of the driver circuit 120.

Figure 2A:
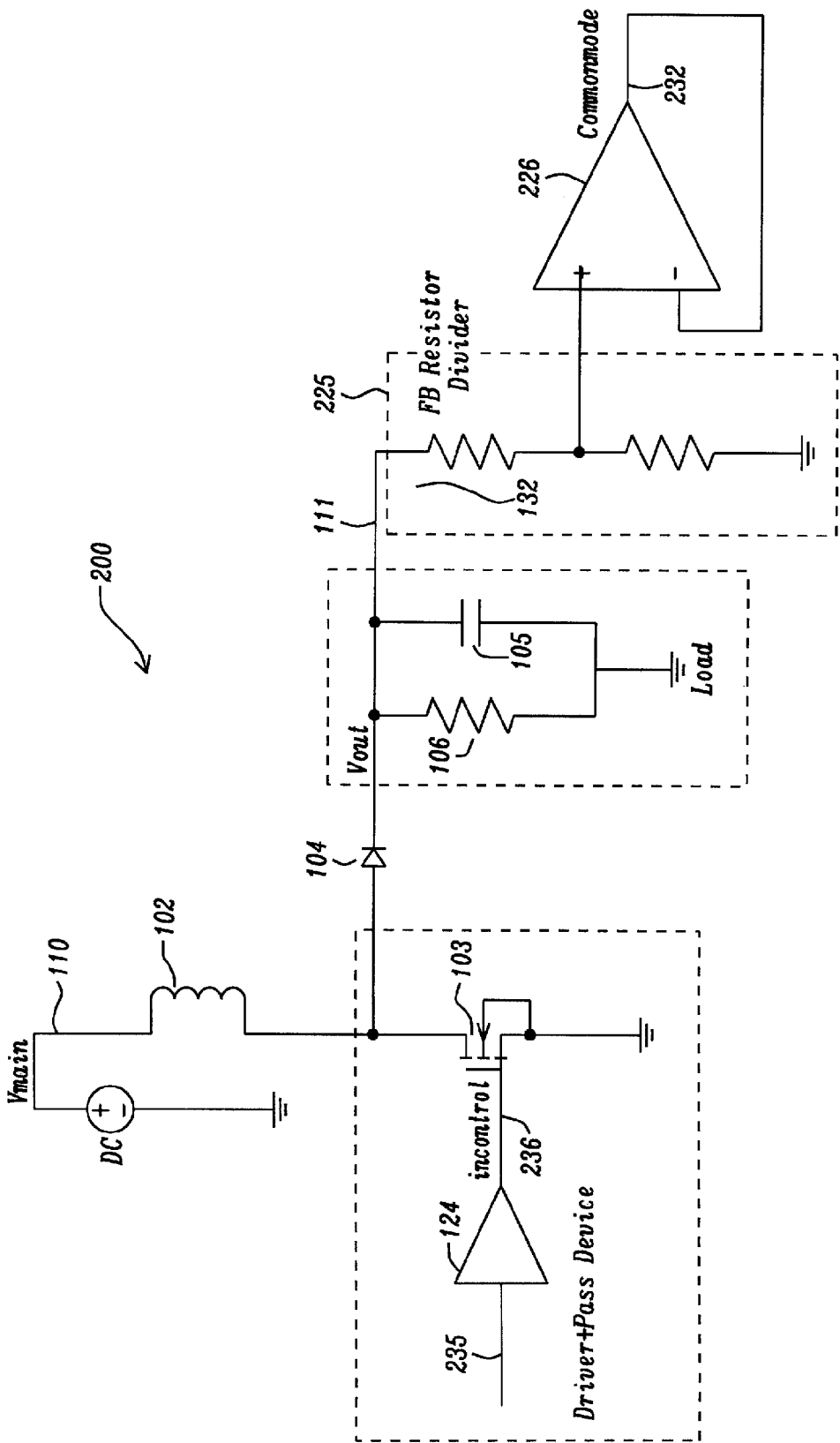
FIGS. 2a to 2e show a circuit diagram of an example system comprising a switched-mode power converter and a driver circuit.
Figure 2B:
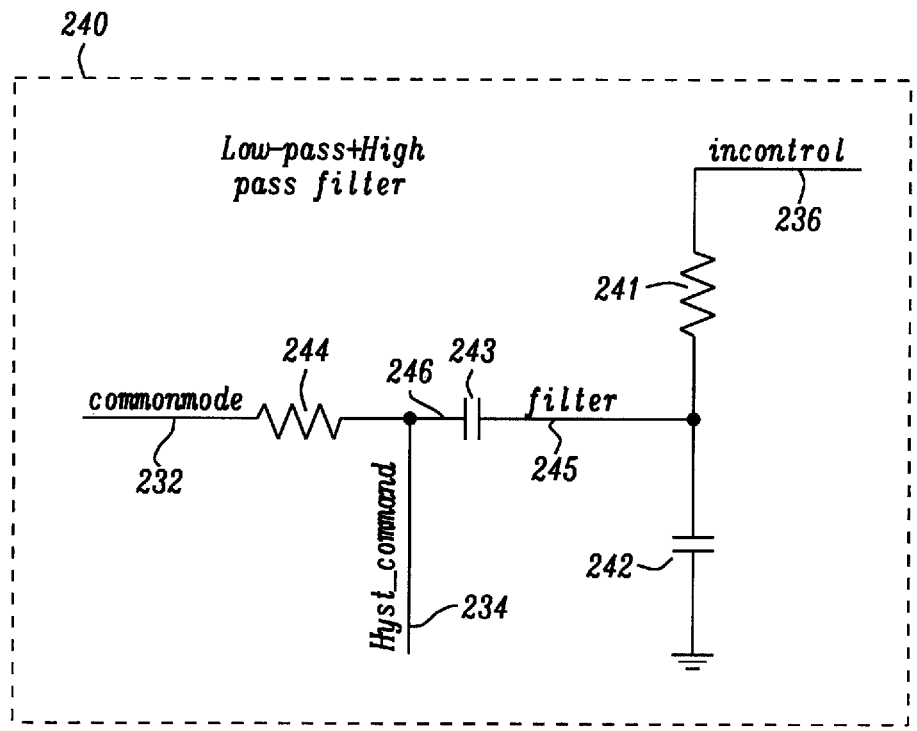
Figure 2C:
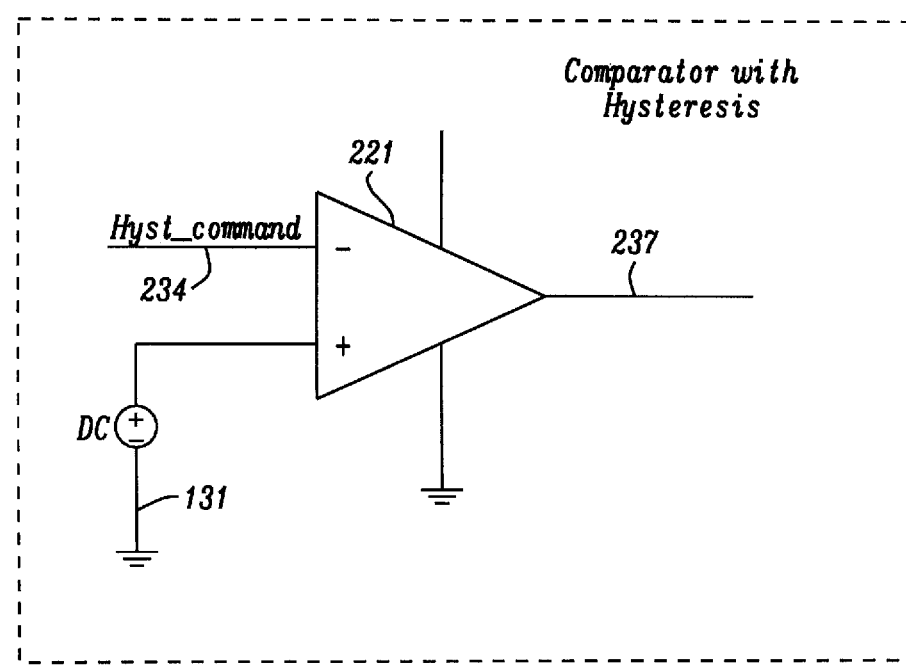
Figure 2D:
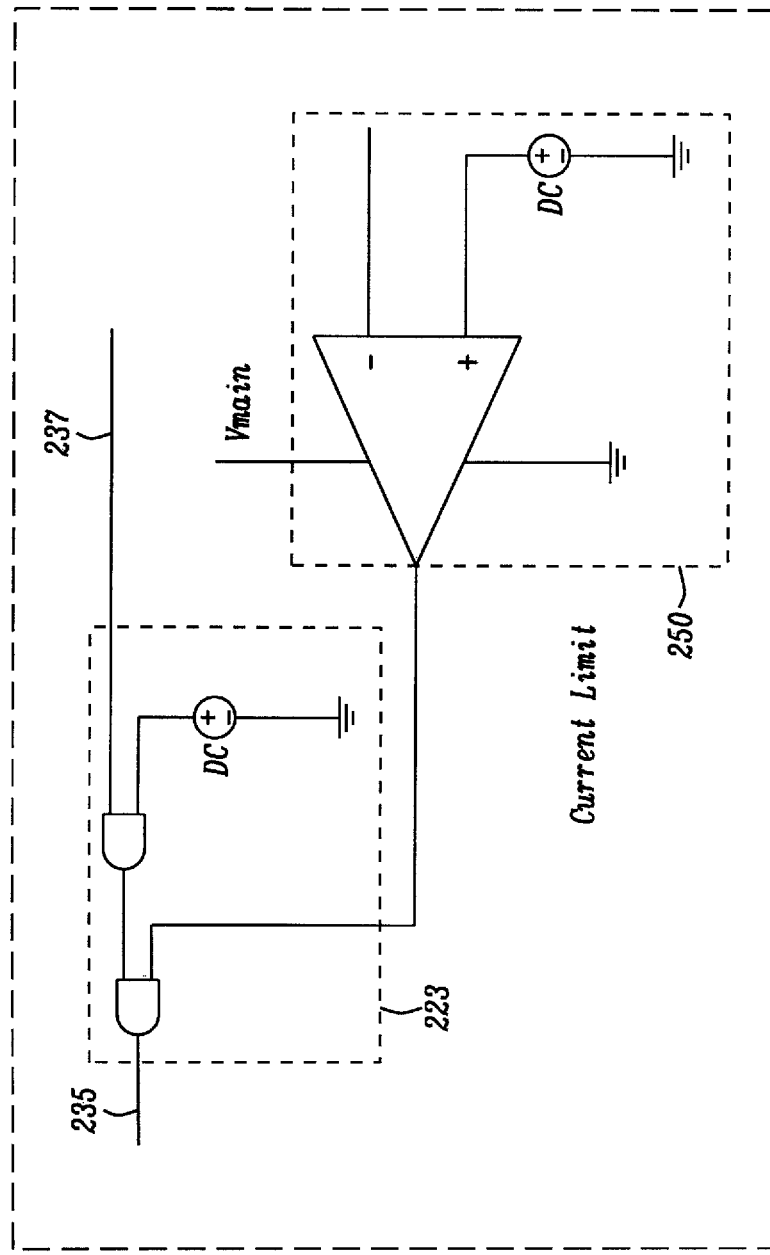
Figure 2E:
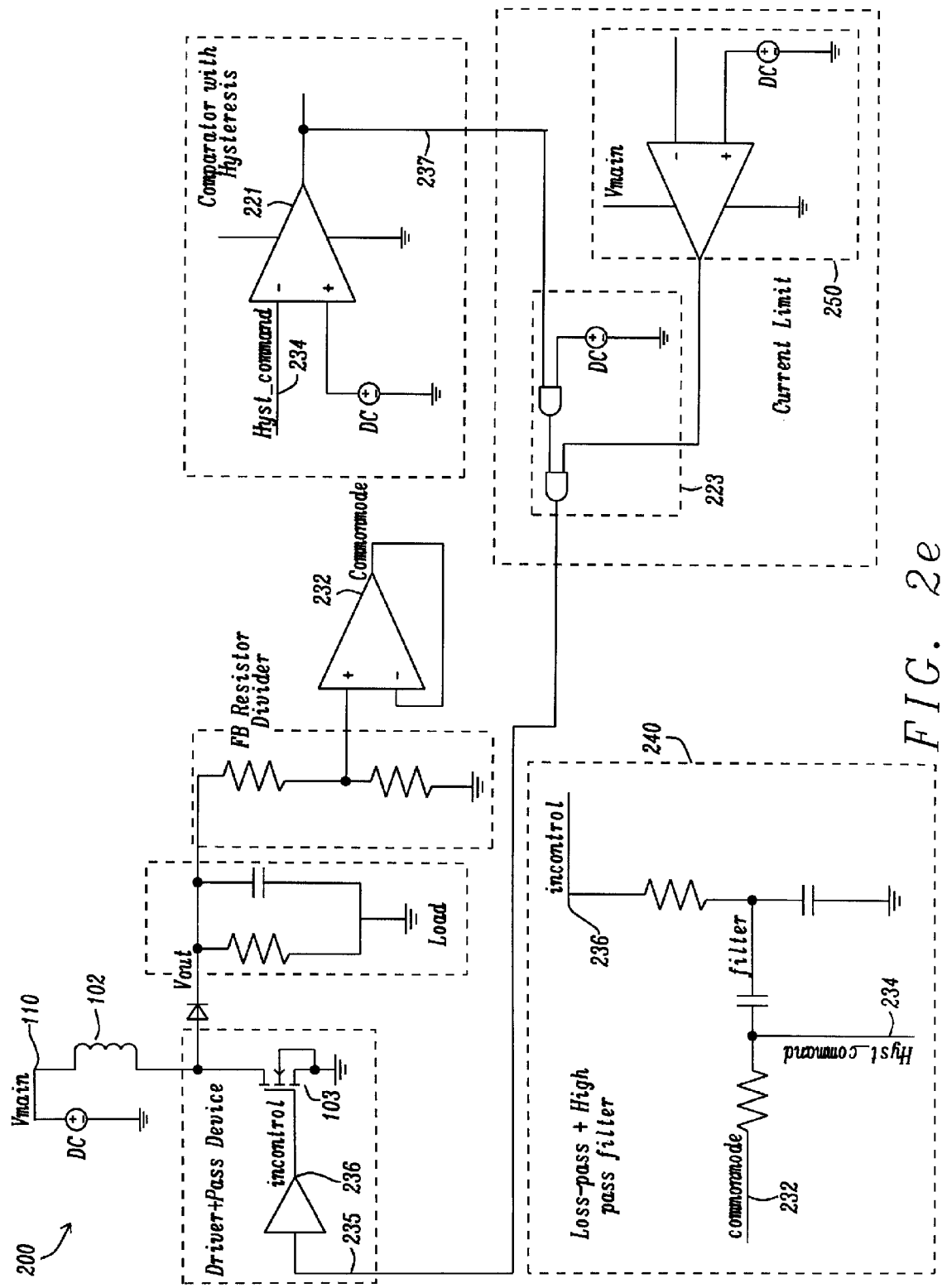

FIGS. 2a to 2e show a circuit diagram of an example system 200 which comprises a switched-mode power converter and a corresponding driver circuit. FIGS. 2a to 2d show subcomponents of the system 200 and FIG. 2e shows an overview of the example system 200 (comprising the subcomponents of FIGS. 2a to 2d). The illustrated power converter comprises a boost converter with an inductor 102 (FIG. 2a), a diode 104 (FIG. 2a), a switch 103 (FIG. 2a), and a capacitor 105 (FIG. 2a). Furthermore, FIG. 2a illustrates a voltage divider 225 which is configured to provide the feedback voltage 132 (which is derived from the output voltage 111 of the power converter). Furthermore, FIG. 2a illustrates an operational amplifier 226 which is configured to amplify the feedback voltage 132, thereby providing an amplified feedback voltage 232.

The switch 103 of the power converter is controlled using a control signal 236 (FIG. 2a) which is applied to the gate of the switch 103. In the illustrated example, the switch 103 is a NMOS (N-type metal oxide semiconductor) FET (field effect transistor). The gate control signal 236 is generated using the driver 124, based on the logic control signal 235 which takes on logic values of "0" or "1", wherein the logic value "0" typically indicates an off-state of the switch 103 and wherein the logic value "1" typically indicates an on-state of the switch 103 (or vice versa).

FIG. 2b shows how the system 200 (and in particular the driver circuit) determines the sensed current, i.e. the current corresponding to the current 112 through the inductor 102, without the need for explicit current sensing means 101. In the present document, it is proposed to determine the sensed current (or a voltage 234 which is indicative of the inductor current 112) based on the gate control signal 236 which is applied to the gate of the switch 103 of the power converter. As a result, the sensed current (or the corresponding voltage 234) can be determined within the driver circuit without the need of an additional pin and without the need of explicit current sensing means within the power converter. In the present document, the sensed current will be referred to as the estimated inductor current. The voltage 234 is indicative of the estimated inductor current.

FIG. 2b illustrates a filter unit 240 which is configured to determine the voltage 234 which is indicative of the inductor current 112 from the gate control signal 236. The filter unit 240 comprises a low pass filter which is configured to integrate the gate control signal 236 along the time line, thereby providing a low pass filtered signal 245 (i.e. a low pass filtered voltage 245). In the illustrated example, the low pass filter comprises an RC circuit (comprising a resistor 241 and a capacitor 242). Furthermore, the filter unit 240 comprises a high pass filter which is configured to remove a DC component from the low pass filtered signal 245, thereby providing an AC signal 246 (i.e. an AC voltage 246). In the illustrated example, the high pass filter comprises a capacitor 243.

The AC signal 246 is indicative of the inductor current 112. The AC signal 246 may be overlaid with the (amplified) feedback voltage 232, thereby providing a command signal 234 (i.e. a command voltage 234) for the hysteretic control of the power converter. The command signal 234 typically corresponds to a saw wave (due to the AC signal 246) which is offset by a DC component (due to the amplified feedback voltage 232).

In other words, the low pass filter 241, 242 of the filter unit 240 is configured to integrate the gate control signal 236 (i.e. the gate control voltage 236) over time. The low pass filter 241, 242 (notably the resistor 241 and the capacitor 242) may be dimensioned such that the low pass filtered signal 245 provides a measure of the inductor current 112. In particular, the characteristics of the low pass filter 241, 242 (e.g. the resistance of the resistor 241 and/or the capacitance of the capacitor 242) may be determined based on the inductance of the inductor 102. From low pass filter theory the following differential equation may be obtained:

$$C*(dVi/dt)+Vi/R=0$$

where C is the capacitance of the capacitor 242, R is the resistance of the resistor 241 and Vi is the gate control signal 236.

The current in the coil 102 follows the rule below (wherein the very small resistances of the coil 102 and of pass device 103 have been neglected). The latter assumption is typically true because the coil is usually big in comparison to the resistance, such that the current is dominated by the coil. The current through the coil 102 is therefore given by $$L*(dIcoil/dt)=V1$$

wherein L is the inductance of the inductor 102, Icoil is the current through the inductor 102 and V1 is the voltage drop at the inductor 102 (which may be considered to be equal to the input voltage Vmain). The filter unit 240 should be designed such that $$dIcoil/dt=dVi/dt$$

which leads to the following relation:

$$Vi/(C*R)=Vmain/L$$

As such, the characteristics of the low pass filter 241, 242 (e.g. the resistance R of the resistor 241 and/or the capacitance C of the capacitor 242) may be determined based on the inductance L of the inductor 102, and based on the input voltage Vmain 110, and based on the high value of the gate control voltage Vi 236 (e.g Vccmain).

The signal 245 from the low pass filter goes to the high pass filter 243. The high pass filter 243 is configured to clean the low pass filtered signal 245 from the average value of the gate control voltage 236. If the gate control voltage 236 takes on a high value at the supply voltage VCCmain and a low value at ground, then the average value of the gate control voltage 236 may be determined as VCCmain*DutyCycle. As a result of high pass filtering the signal 245, only the AC signal 246 (i.e. a pure AC component) is obtained.

The AC signal 246 may be referred to the common mode signal 232. The common mode signal 232 is typically proportional to the output voltage 111. As illustrated in FIG. 2a, the common mode signal 232 may be derived from the output voltage 111 by means of the voltage divider 225 and by means of the operational amplifier or buffer 226. The buffer may be used to isolate the output of the system 200 from the generation of the triangular waveform within the filter unit 240. As such, the resulting command signal 234 corresponds to a replica of the inductor current 112 overlapped with the information of the output voltage 111.

The resulting command signal 234 (referred to as hyst_command in FIG. 2), typically corresponds to the triangular waveform of the inductor current 112 which is offset by a value proportional to the output voltage 111. The command signal 234 may be compared with the reference voltage 131 using a comparator 221 with hysteresis (see FIG. 2c). As a result, a PWM (pulse width modulated) signal 237 is obtained which is used to control the switch 103 (also referred to as a pass device 103).

Overall, FIG. 2 shows a system 200 comprising a hysteretic boost converter, wherein the system 200 uses as a current sensor a filtering unit 240 on the gate control signal 236 of the gate of the pass device 103.

FIG. 2c shows the comparator 221 which is configured to compare the command signal 234 with the reference voltage 131, thereby yielding the PWM signal 237 (e.g. a voltage) which is used to determine the logic gate control signal 235 (i.e. the PWM signal which is used to control the pass device 103). The signal 237 is provided to the logic unit 223 which determines the PWM logic control signal 235 for driving the pass device 103. This is illustrated in FIG. 2d. FIG. 2d also illustrates a current limiting unit 250 which is configured to limit the inductor current 112 (by reducing the length of the on-states of the pass device 103), e.g. upon start-up of the power converter.

Figure 3:
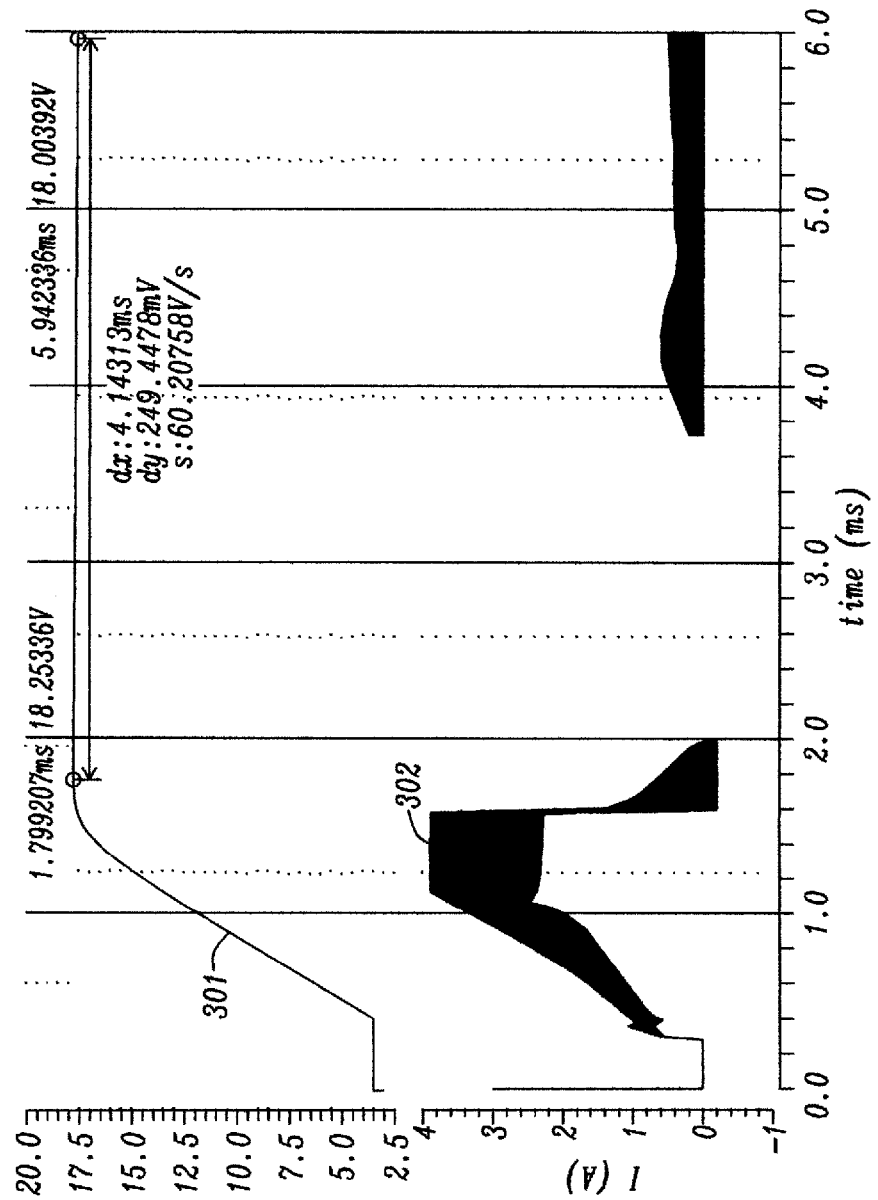
FIG. 3 illustrates example measurements at the start-up of the system of FIGS. 2a to 2d.

FIG. 3 illustrates measurements upon the start-up of the system 200 of FIG. 2. In particular, FIG. 3 illustrates the ramp-up of the output voltage 301 (reference sign 111 in FIGS. 1 and 2a), as well as the inductor current 302 (reference sign 112 in FIG. 1). In the illustrated example, the target value for the output voltage 301 (in a regulated state) is 18V. It can be seen that the system 200 arrives at a stable regulated state in less than 2 ms with only a small voltage overshoot.

Figure 4:
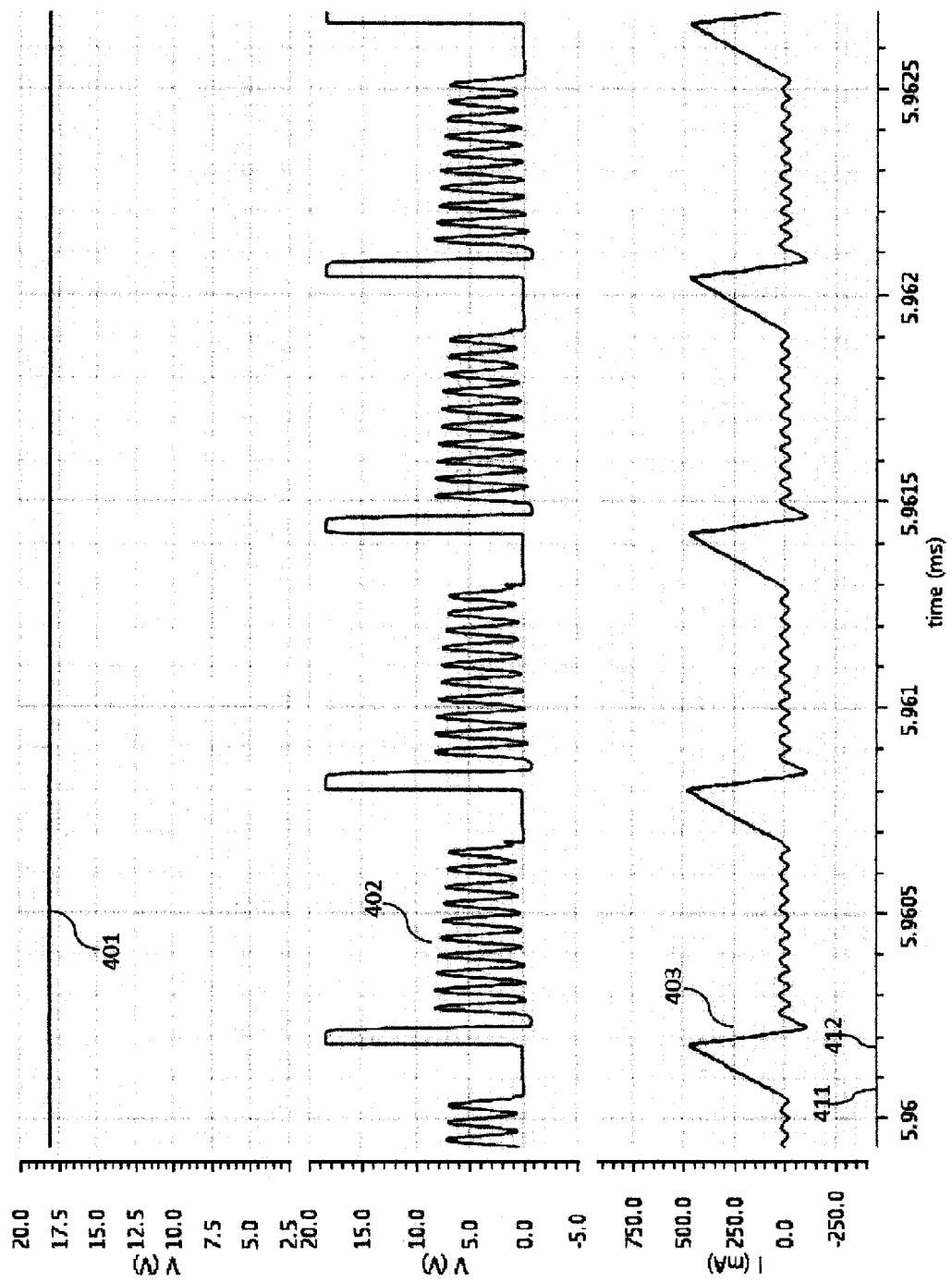
FIG. 4 illustrates example measurements for the system of FIGS. 2a to 2d for low load currents (in the range of 10 mA).

FIG. 4 shows measurements of the system 200 subject to a relatively low load current 113 of 10 mA. FIG. 4 illustrates the output voltage 401 (reference sign 111 in FIGS. 1 and 2a), the voltage 402 at the switching node (which lies at the drain of the pass device 103, i.e. which lies at the point between inductor 102 and pass device 103) and the inductor current 403. It can be seen that the driver circuit controls the pass device 103 such that when switching to the on-state (e.g. at time instant 411, the voltage 402 is pulled to ground and the inductor current 403 increases. At time instant 412, the driver circuit controls the pass device 103 to switch to the off-state such that the voltage 402 at the switching node moves up to the regulated output voltage 401. Once the inductor 102 has passed the stored energy to the capacitor 105, i.e. once the inductor current 403 has dropped back to zero, the voltage 402 and the inductor current 403 show oscillations. These oscillations are not, however, passed to the regulated output voltage 401.

Figure 5:
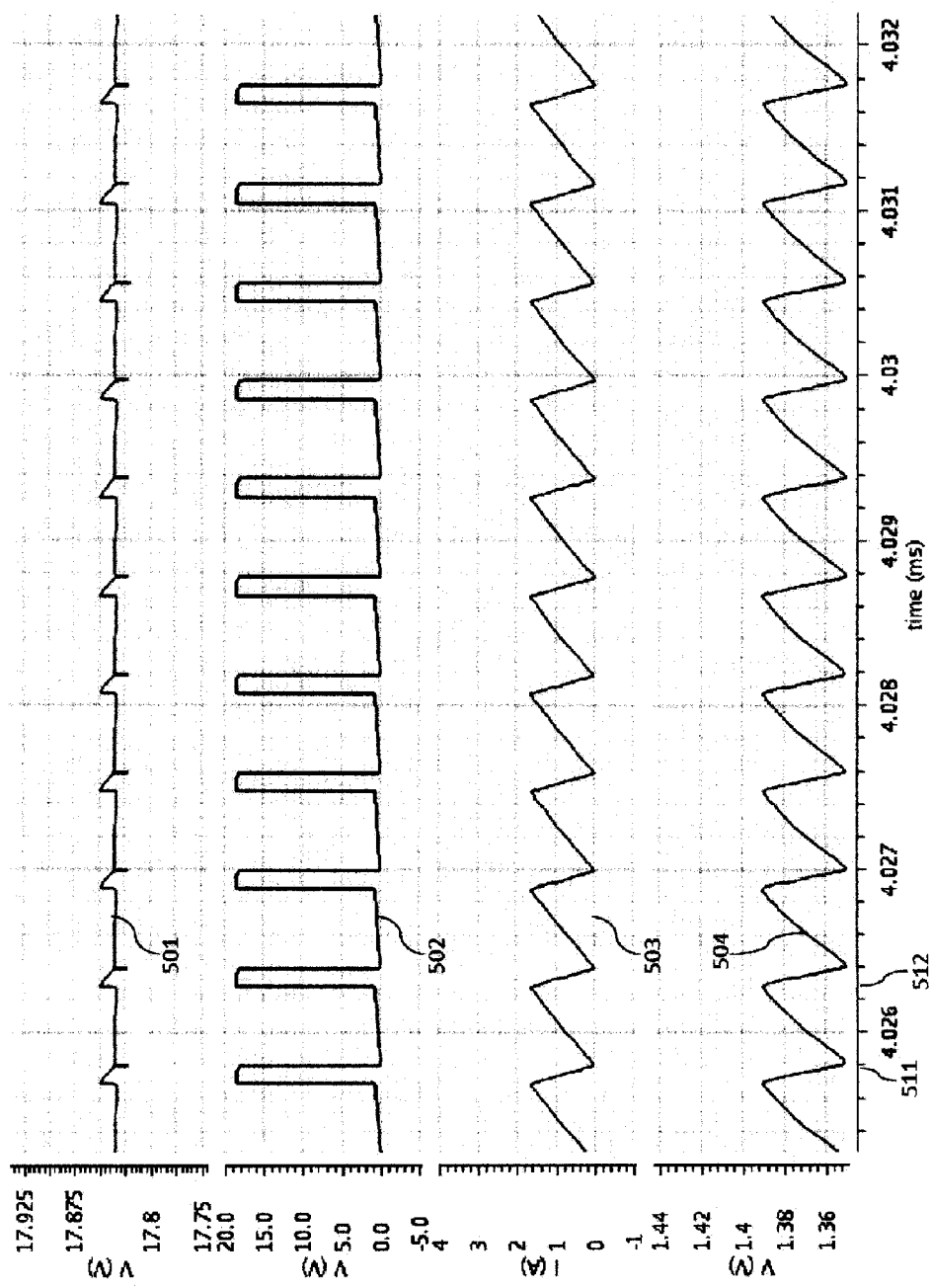
FIG. 5 illustrates example measurements for the system of FIGS. 2a to 2d for high load currents (in the range of 250 mA).

FIG. 5 shows measurements of the system 200 subject to a relatively high load current 113 of 250 mA. FIG. 5 illustrates the output voltage 501 (reference sign 111 in FIGS. 1 and 2a), the voltage 502 at the switching node (which lies at the drain of the pass device 103), the inductor current 503 and the command signal 504 for the hysteretic control (i.e. the command signal 234 in FIG. 2). It can be seen that the command signal 504 is proportional to the actual inductor current 503, thereby proving the fact that the inductor current can be derived from the gate control signal 236 without the need of explicit current sensing means 101 and without the need of an extra pin. It can be seen that the pass device 103 is controlled to switch to the on-state at time instant 511 and to the off-state at time instant 512.

Figure 6:
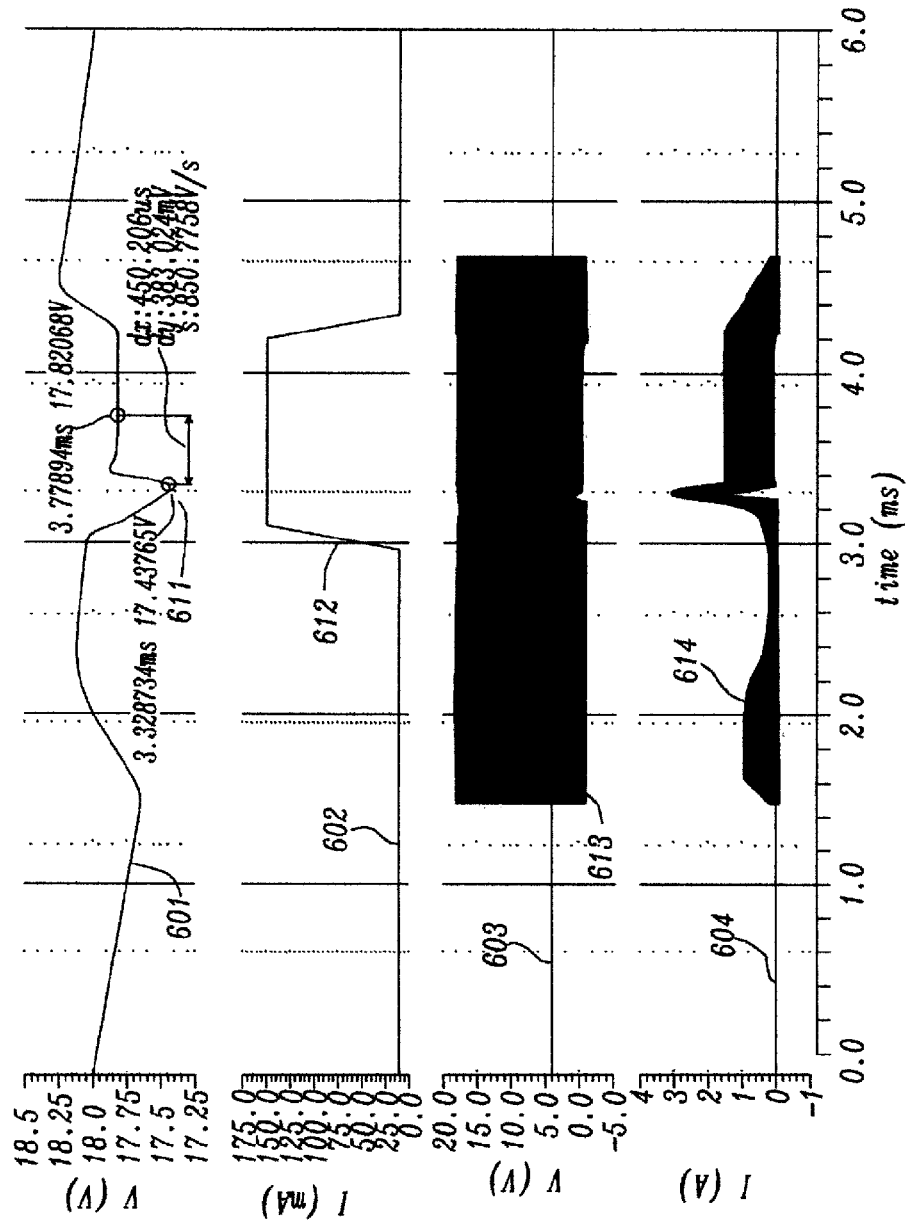
FIG. 6 illustrates example measurements for the system of FIGS. 2a to 2d subject to load transients.

FIG. 6 shows measurements of the system 200 subject to a load transient. FIG. 6 shows the output voltage 601 of the power converter (i.e. the output voltage 111 in FIG. 2), the load current 602 of the power converter (i.e. the current 113 in FIG. 1), the voltage 603 at the switching node of the power converter and the inductor current 603 through the inductor 102. It can be seen that even in a situation of a load transient (from 10 mA to 250 mA and back), the system 200 is stable. In particular, it can be seen, that the pass device 103 is operated in a switched mode during a time period 613 where the output voltage 601 deviates from the target voltage of 18V by more than a threshold value. An inductor current 604 is flowing only during the time period 614 which corresponds to the time period 613. Furthermore, it can be seen that subject to a load transient 612, there is a small drop 611 of the output voltage 601. The system 200 reacts to the drop 611 of the output voltage 601 and draws an increased inductor current 604, until the output voltage 601 is stabilized back to the target voltage of 18V.

Figure 7:
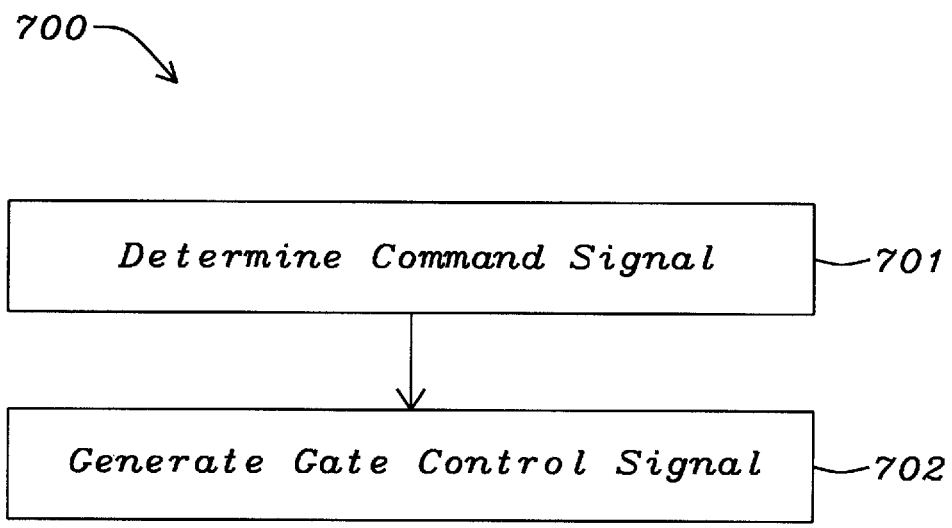
FIG. 7 shows a flow chart of an example method for controlling the switch of a switched-mode power converter.

FIG. 7 illustrates an example method 700 for controlling the switch 103 of a switched-mode power converter. As outlined in the present document, the switched-mode power converter may comprise an inductor 102 configured to store energy during a first state of the switch 103 and configured to release energy towards a load 106 of the switched-mode power converter during a second state of the switch 103. The method 700 comprises the step of determining 701 a command signal 234 based on a gate control signal 236 applied to a gate of the switch 103. The command signal 234 may be indicative of the current 112 through the inductor 102. Furthermore, the method 700 may comprise the step of generating 702 the gate control signal 236 based on the command signal 234, such that the switch 103 alternates between the first and second state when being subjected to the gate control signal 236.

In the present document, a driver circuit for a switched-mode power converter has been described. The driver circuit applies a hysteretic control to the pass device of the power converter, wherein the hysteretic control is based on an indication of the inductor current within the power converter. The indication of the inductor current (i.e. the estimated inductor current) is generated within the driver circuit, thereby removing the need of an explicit pin and explicit current sensing means for providing the inductor current to the driver circuit.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A driver circuit configured to control a switch of a switched-mode power converter; wherein the switched mode power converter comprises an inductor configured to store energy during a first state of the switch and configured to release energy towards a load of the switched mode power converter during a second state of the switch; wherein the driver circuit comprises:
a filter unit which is configured to determine a command signal based on a gate control signal applied to a gate of the switch, wherein the command signal is indicative of a current through the inductor; wherein the filter unit comprises a low pass filter for filtering the gate control signal to determine a low pass filtered signal from the gate control signal; wherein the filter unit comprises a high pass filter configured to remove a DC component from the low pass filtered signal, thereby yielding an AC signal; wherein the command signal is derived from the AC signal; and
hysteretic control circuitry configured to generate the gate control signal based on the command signal, wherein the switch alternates between the first and second state when being subjected to the gate control signal.

2. The driver circuit of claim 1 wherein the design parameters of the low pass filter depend on an inductance of the inductor.

3. The driver circuit of claim 1 wherein the low pass filter comprises an RC circuit with a resistor and a capacitor.

4. The driver circuit of claim 1, wherein the DC component depends on a supply voltage for the gate control signal and/or on a duty cycle of the switch.

5. The driver circuit of claim 1, wherein the high pass filter comprises a capacitor.

6. The driver circuit of claim 1, wherein the filter is configured to offset the AC signal by a feedback signal by derived from an output voltage of the switched-mode power converter, thereby yielding the command signal.

7. The driver circuit of claim 1, wherein the hysteretic control circuitry comprises a comparator configured to compare the command signal with a reference signal; and the hysteretic control circuitry is configured to generate the gate control signal as a pulse width modulated signal based on the comparison of the command signal to the reference signal.

8. The driver circuit of claim 7, wherein the reference voltage is indicative of a target voltage of an output voltage of the switched-mode power converter.

9. The driver circuit of claim 1, wherein the hysteretic control circuitry comprises a current limitation circuit configured to modify the gate control signal such that the current through the inductor does not exceed a pre-determined inductor current threshold.

10. The driver circuit of claim 1, wherein the switch comprises a metal oxide semiconductor field effect transistor.

11. The driver circuit of claim 1, wherein the switched-mode power converter comprises a boost converter, a buck converter or a buck-boost converter.

12. A system for deriving a regulated output voltage from an input voltage, the system comprising:
a switched-mode power converter comprising a switch, wherein the switched-mode power converter comprises an inductor configured to store energy during a first state of the switch and configured to release energy towards a load of the switched-mode power converter during a second state of the switch; and
a driver circuit configured to control the switch of the switched-mode power converter; wherein the driver circuit comprises a filter unit which is configured to determine a command signal based on a gate control signal applied to a gate of the switch, wherein the command signal is indicative of a current through the inductor; wherein the filter unit comprises a low pass filter for filtering the gate control signal to determine a low pass filtered signal from the gate control signal; wherein the filter unit comprises a high pass filter configured to remove a DC component from the low pass filtered signal, thereby yielding an AC signal; wherein the command signal is derived from the AC signal; and hysteretic control circuitry configured to generate the gate control signal based on the command signal, wherein the switch alternates between the first and second state when being subjected to the gate control signal.

13. A method for controlling a switch of a switched-mode power converter, wherein the switched-mode power converter comprises an inductor configured to store energy during a first state of the switch and configured to release energy towards a load of the switched-mode power converter during a second state of the switch, the method comprising:
determining a command signal based on a gate control signal applied to a gate of the switch, wherein the command signal is indicative of a current through the inductor; and
generating the gate control signal based on the command signal, wherein the switch alternates between the first and second state when being subjected to the gate control signal; wherein determining the command signal comprises using a low pass filter for filtering the gate control signal to determine a low pass filtered signal from the gate control signal; and using a high pass filter to remove a DC component from the low pass filtered signal, thereby yielding an AC signal; wherein the command signal is derived from the AC signal.

14. A method of controlling a switch of a switched-mode power converter, comprising:
providing a driver circuit configured to control a switch of a switched-mode power converter, wherein the switched mode power converter comprises and inductor configured to store energy during a first state of the switch and configured to release energy towards a load of the switched mode power converter during a second state of the switch;
providing a filter unit which is configured to determine a command signal based on a gate control signal applied to agate of the switch, wherein the command signal is indicative of a current through the inductor; wherein the filter unit comprises a low pass filter for filtering the gate control signal to determine a low pass filtered signal from the gate control signal; wherein the filter unit comprises a high pass filter to remove a DC component from the low pass filtered signal, thereby yielding an AC signal; wherein the command signal is derived from the AC signal; and
using configured hysteretic control circuitry to generate the gate control signal based on the command signal, wherein the switch alternates between the first and second state when being subjected to the gate control signal.

15. The method of claim 14, wherein the design parameters of the low pass filter depend on the inductance of the inductor.

16. The driver circuit of claim 14 wherein the low pass filter comprises an RC circuit with a resistor and a capacitor.

* * * * *